Figure 1:
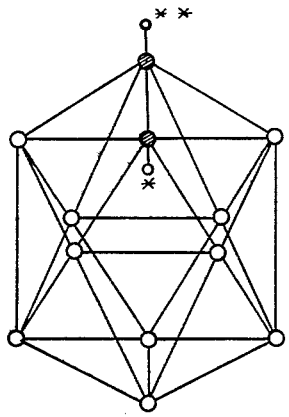
Figure 1:
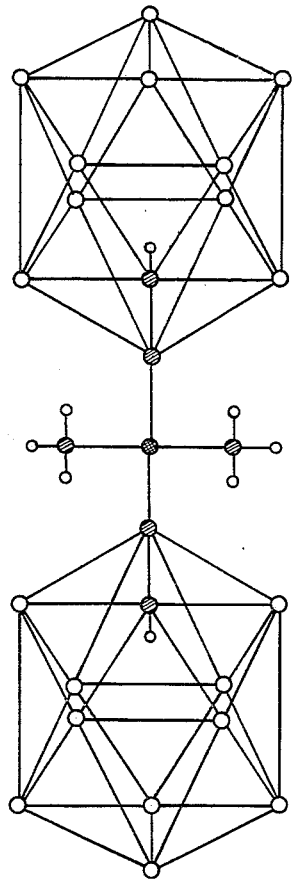

June 16, 1964

S. PAPETTI 3,137,719

SILICON-CONTAINING ORGANOBORON COMPOUNDS
AND METHOD FOR THEIR PREPARATION

Filed Jan. 25, 1961

FORMULA I

FORMULA II

○ BORON
⊘ CARBON
⊛ SILICON
∘ HYDROGEN ON CARBON
  (HYDROGEN ATOMS ON BORON
   OMITTED FOR CLARITY)

*INVENTOR:*
STELVIO PAPETTI
BY
Walter D. Hunter
AGENT

United States Patent Office 3,137,719
Patented June 16, 1964

3,137,719
SILICON-CONTAINING ORGANOBORON COMPOUNDS AND METHOD FOR THEIR PREPARATION
Stelvio Papetti, Hamden, Conn., assignor to Olin Mathieson Chemical Corporation, a corporation of Virginia
Filed Jan. 25, 1961, Ser. No. 84,955
16 Claims. (Cl. 260—448.2)

This invention relates to silicon-containing organoboron compounds and to a method for their preparation. The silicon-containing organoboron compounds are prepared by reacting an organoboron alkali metal compound of the formula:

$$RR^aB_{10}H_8(CR^bCR^c)$$

wherein R and $R^a$ are each selected from the class consisting of hydrogen and an alkyl radical containing from 1 to 5 carbon atoms and wherein $R^b$ and $R^c$ are each selected from the class consisting of hydrogen, an alkali metal, an alkyl radical and an alkenyl radical, at least one of $R^b$ and $R^c$ being an alkali metal and the total number of carbon atoms in $R^b$ and $R^c$ taken together not exceeding eight, with a silane compound of the formula:

$$R_n^dSiR^e_{(4-n)}$$

wherein $R^d$ is selected from the group consisting of an alkyl radical containing 1 to 5 carbon atoms or an aryl radical containing not more than 10 carbon atoms and wherein $R^e$ is selected from the group consisting of a halogen and a haloalkyl radical containing from 1 to 5 carbon atoms, said halogen being selected from the group consisting of chlorine, bromine and iodine and $n$ is an integer of 1 to 3, with the proviso that when $R^e$ is a haloalkyl radical $n$ is at least 2.

Organoboron alkali metal compounds useful as starting materials in the process of this invention can be prepared by reacting a material selected from the class consisting of an alkali metal alkyl and alkali metal aryl, a compound of the class $$RR^aB_{10}H_8(CR^bCR^c)$$

wherein R and $R^a$ are each selected from the class consisting of hydrogen and an alkyl radical containing from 1 to 5 carbon atoms, wherein $R^b$ and $R^c$ are each selected from the class consisting of hydrogen, an alkyl radical and an alkenyl radical, at least one of $R^b$ and $R^c$ being hydrogen, and the total number of carbon atoms in $R^b$ and $R^c$ taken together not exceeding eight. Preparation of these compounds is described in application Serial No. 809,571, filed April 28, 1959 of Ager and Heying. For example, $B_{10}H_{10}[CHC(Li)]$ can be prepared by reacting equimolar quantities of methyl lithium with carborane $[B_{10}H_{10}(CHCH)]$, in diethyl ether. Methyl lithium dissolved in diethyl ether is added to a diethyl ether solution of carborane until as indicated by a wet test gas meter sufficient methane has been produced to indicate the formation of the mono-lithium salt. In the final phase of the reaction it is sometimes necessary to heat the reaction mixture to a temperature somewhat below reflux temperature in order to accelerate the methane evolution. Evaporation of the diethyl ether from the reaction mixture leaves a residue which is $B_{10}H_{10}[CHC(Li)]$.

Compounds of the class $RR^aB_{10}H_8(CR^bCR^c)$ can be prepared by the reaction of decaborane or an alkylated decaborane having 1 to 2 alkyl groups containing 1 to 5 carbon atoms in each alkyl group with an acetylenic hydrocarbon containing from 2 to 10 carbon atoms in the presence of a wide variety of ethers, nitriles or amines. The preparation of these compounds is described in application Serial No. 741,976, filed June 13, 1958 of Ager, Heying and Mangold, now abandoned. For example, $B_{10}H_{10}(CHCH)$ can be prepared by reacting for about 12 hours at 125° C. a mixture of decaborane and tetrahydrofuran in an autoclave pressured to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecarborane and the like, can be prepared, for example, according to the method described in Altwicker et al. application Serial No. 497,407, filed March 28, 1955, now U.S. Patent No. 2,999,117, granted September 5, 1961.

The novel silicon-containing organoboranes of this invention are of the class consisting of:

$$R_n^dSiX_m[C(R^b)C(B_{10}H_8RR^a)]_{[4-(m+n)]}$$

and $$R_2^dSi(R^e)_r(R^f)_{(2-r)}[CHC(B_{10}H_8RR^a)]_{(2-r)}$$

wherein R and $R^a$ are each selected from the class consisting of hydrogen and an alkyl ralical containing 1 to 5 carbon atoms, wherein $R^b$ is selected from the class consisting of hydrogen, an alkyl radical containing 1 to 8 carbon atoms and an alkenyl radical containing 1 to 8 carbon atoms, wherein $R^d$ is an alkyl radical containing 1 to 5 carbon atoms, wherein X is a halogen selected from the class consisting of chlorine, bromine, and iodine, wherein $R^e$ is a haloalkyl radical containing 1 to 5 carbon atoms, said halogen being selected from the group consisting of chlorine, bromine and iodine, wherein $R^f$ is a bivalent saturated hydrocarbon radical containing 1 to 5 carbon atoms, wherein $n$ is an integer from 1 to 3, $m$ is an integer from 0 to 2, $r$ is an intger of from 0 to 1 and the sum of $m$ plus $n$ is not over 3.

The solid products prepared in accordance with the method of this invention when incorporated with suitable oxidizers such as ammonium perchlorate, potassium perchlorate, sodium perchlorate, ammonium nitrate and the like, yield solid propellant suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The ratio of the reactants can vary widely, generally being within the range of from about 0.5 to about 10 moles of silane compound per mole of organoboron compound employed and preferably in the range of from about 1 to 5 moles of silane compound per mole of organoboron alkali metal compound.

The temperature of the reaction of the organoboron alkali metal compound with the silane compound is generally maintained between −90° C. and +70° C. and preferably at or below room temperature.

The pressure employed can be varied widely, although atmospheric pressure reactions are convenient. The reaction of the organoboron alkali metal compound with silane compound is substantially instantaneous. Slow addition of the silane compound is practiced to prevent overheating.

Silane compounds suitable as starting materials in the process of this invention include, for example, methyltrichlorosilane, dimethyldichlorosilane, triethylchlorosilane, diethyldichlorosilane, di-n-propyldichlorosilane, n-butyltrichlorosilane, diphenyldichlorosilane, triphenylchlorosilane, amyltrichlorosilane, triamylchlorosilane, phenyltrichlorosilane, tolyltrichlorosilane, trimethylchloromethylsilane, diethyl - bis(chloromethyl)silane, diethyldi-n-chloropropylsilane, tri-n-propylchloroethylsilane, and the corresponding bromine and iodine derivatives.

The preferred alkali metal alkyl are the lithium alkyls such as methyl lithium, ethyl lithium, isopropyl lithium, n-propyl lithium, n-butyl lithium, sec-butyl lithium, t-butyl lithium, n-amyl lithium and the like, since they are soluble in inert organic solvents. Other alkali metal alkyls, such as sodium and potassium alkyls can, however, also be employed as can the alkali metal aryls including phenyl lithium.

The reaction can be carried out in an inert solvents other than the diethyl ether employed in this specific examples. Such solvents include for example, dimethyl ether, diethyl ether, methylethyl ether, diisopropyl ether, di-n-propyl ether, ethyl-n-butyl ether, ethylene glycol dimethyl ether, dioxane and tetrahydrofuran.

This invention is illustrated in detail by the following examples which are to be considered not limitative.

In the example, the term "moles" signifies gram moles.

EXAMPLE I (A) *Preparation of Lithium Carborane* $[B_{10}H_{10}(CHC(Li))]$

Lithium carborane was prepared in the manner described in Ager et al. application Serial No. 809,571, filed April 28, 1959.

The preparation of methyl lithium was carried out in a three neck, 500 ml. flask connected to a bubble-off and equipped with a magnetic stirrer, a gas inlet tube, a dropping funnel and a water-cooled condenser. Previous to being used, the system was flushed with a stream of nitrogen. An amount of 100 ml. of dry diethyl ether and 2.8 grams (0.4 atom) of lithium metal shot were placed in the reaction flask. An amount of 28.5 grams (0.2 mole) of methyl iodide dissolved in 100 ml. of diethyl ether was added dropwise to the stirred lithium shot at room temperature. As soon as the reaction started the flask was cooled to a temperature of about 0° C. and the remainder of the methyl iodide solution was added over a period of 45 minutes. Throughout the reaction, cooling of the reaction flask was necessary to slow down the reaction rate. After all of the methyl iodide solution had been added, the reaction mixture was allowed to warm up to room temperature and then heated at reflux for one hour. The reaction mixture was filtered through glass wool and finally 50 ml. of a clear solution of methyl lithium in diethyl ether was decanted from the reaction mixture.

In a nitrogen atmosphere 14.4 grams (0.1 mole) of carborane $[B_{10}H_{10}(CHCH)]$ was dissolved in 170 ml. of dry diethyl ether in a round bottom, 1-liter, three neck flask equipped with a magnetic stirrer, a gas inlet tube, a dropping funnel and a Dry Ice condenser connected to a wet test meter through a Dry Ice trap. The system was also provided with a bubble off. A quantity of the previously prepared methyl lithium ether solution was added to the dropping funnel and about 100 ml. of this solution was added dropwise at approximately 0° C. to the reactor. At this point some 0.1 mole of methane as measured by the wet test meter had been evolved from the reaction mixture thus indicating the reaction of the methyl lithium with carborane to form the compound lithium carborane $[B_{10}H_{10}(CHC(Li))]$. The lithium carborane solution so formed (approximately 265 mls.) was transferred to a calibrated addition funnel.

(B) *Trimethylsilylcarborane*

In the apparatus previously described for the preparation of lithium carborane 1.52 grams (0.014 mole) of trimethylchlorosilane was added dropwise at room temperature to 37.1 ml. lithium carborane of the previously prepared lithium carborane diethyl ether solution containing 2.2 grams or 0.014 mole of lithium carborane. The reaction was instantaneous as evidenced by the immediate precipitation of lithium chloride. To insure completion of the reaction the mixture was refluxed for an additional six hour period. The product was then treated with 50 mls. cold dilute hydrochloride acid solution to decompose any unreacted lithium carborane and also to dissolve the precipitated lithium chloride. Next the ether layer was separated from the aqueous layer and it was dried over calcium chloride for 24 hours and finally taken to dryness. The residue was solved in about 100 ml. of pentane and filtered. When the pentane solution was cooled to 0° C. a first crop of crystals of the desired product was obtained and further cooling to Dry Ice temperature resulted in the crystallization of additional amount of the trimethylsilylcarborane product. The total product was further purified by sublimation under vacuum at 90° C. yielding pure trimethylsilylcarborane $$(CH_3)_3Si[CHC(B_{10}H_{10})]$$

which had a melting point of 94°–95° C. The product was subjected to chemical analysis and the following results were obtained.

Calcd. for $C_5H_{20}SiB_{10}$: B, 30.0; C, 27.8; H, 9.3. Found: B, 29.8, 29.5; C, 28.0, 28.0; H, 9.43, 9.57.

EXAMPLES II–IV

A number of additional experiments were performed using the same apparatus and procedure described in Example I. Pertinent details relating to these experiments are given in Table I below:

TABLE 1

| Example | Reactants | | | | Reaction Temperature (° C.) | Product | Melting Point (° C.) | Analysis of Product | |
|---|---|---|---|---|---|---|---|---|---|
| | Compound | Weight (grams) | Compound | Weight (grams) | | | | Calculated | Found |
| II | $B_{10}H_{10}[CHC(Li)]$ | ¹ 6.2 | $(CH_3)_2SiCl_2$ | 10.74 | 0–35 | $(CH_3)_2Si[CHC(B_{10}H_{10})]_2$ | 195–196.5 | B 62.2<br>C 21.0<br>H 8.2 | 62.5–62.8<br>21.5–21.2<br>8.93–8.2 |
| III | $B_{10}H_{10}[CHC(Li)]$ | ² 0.75 | $(C_6H_5)_3SiCl$ | 1.4 | 0–35 | $(C_6H_5)_3Si[CHC(B_{10}H_{10})]$ | 165–167 | B 26.9<br>C 59.9<br>H 6.5 | 27.1–27.1<br>61.0–62.3, 64.6<br>6.52–6.38, 6.4 |
| IV | $B_{10}H_{10}[CHC(Li)]$ | ³ 7.3 | $(CH_3)_3SiCH_2Cl$ | 5.96 | 0–35 | $(CH_3)_3SiCH_2[CHC(B_{10}H_{10})]$ | 42–52 | B 47.0 | 46.4–46.6 |

¹ Added as 106 ml. of a diethyl ether solution containing 2.1 grams of $B_{10}H_{10}[CHC(Li)]$.
² Added as 12.7 ml. of diethyl ether solution containing 10.74 grams of $B_{10}H_{10}[CHC(Li)]$.
³ Added as 127 ml. of diethyl ether solution containing 0.72 grams of $B_{10}H_{10}[CHC(Li)]$.

EXAMPLE V

In this example the compound:

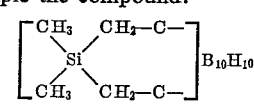

(A.)

was prepared by reacting at a temperature of about 0° to 35° C. 1.65 grams (0.01 mole) of $(CH_3)_2Si(CH_2Cl)_2$ with 3.1 grams (0.02 mole) of $B_{10}H_{10}[C(Li)C(Li)]$ in 56 milliliters of diethyl ether in the same manner as described in Example I (Part B). The starting material, $B_{10}H_{10}[C(Li)C(Li)]$, was made by the process described and claimed in the above Ager and Heying application Serial No. 809,571. In preparing $B_{10}H_{10}[C(Li)C(Li)]$ two moles of methyl lithium were reacted with each mole of $B_{10}H_{10}(CHCH)$ present in the reaction mixture. The course of the reaction was followed as in the preparation of $B_{10}H_{10}[CHC(Li)]$ in Example I, Part A by measuring the evolution of methane with a wet test meter. The product as crystallized from pentane had a melting point of 149–150° C. Analysis of this product gave the following results:

Calcd. for $C_6H_{20}SiB_{10}$: B, 47.4; C, 31.6; H, 8.9. Found: B, 46.8, 46.9; C 32.8, 32.9; H, 9.39, 9.34.

EXAMPLE VI

*Dimethylchlorosilylcarborane*

In this example 9.0 grams (0.07 mole) of dimethyldichlorosilane was reacted with 10.5 grams (0.07 mole) of lithium carborane dissolved in diethyl ether in the same apparatus and in the same manner as described in Example I yielding dimethylchlorosilylcarborane $$(CH_3)_2ClSi[CHC(B_{10}H_{10})]$$

The boron-containing solid materals produced by practicing the method of this invention can be employed as ingredients of solid propellant compositions in accordance with general procedures which are well understood in the art inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula $$(CH_3)_3Si[CHC(B_{10}H_{10})]$$

as described in Example I has the same structural formula as structural Formula I in FIGURE 1 with the exception that the hydrogen atom indicated by the single asterisk is replaced by $-Si(CH_3)_3$.

$(C_6H_5)_3Si[CHC(B_{10}H_{10})]$, the compound described in Example III has the same structural formula as structural Formula I in FIGURE 1 with the exception that the hydrogen atom indicated by a single asterisk is replaced by $-Si(C_6H_5)_3$.

The compound $(CH_3)_3SiCH_2[CHC(B_{10}H_{10})]$ as described in Example IV also has the same structural formula as structural Formula in FIGURE 1 with the exception that the hydrogen atom designated by a single asterisk is replaced by $-CH_2Si(CH_3)_3$.

The compound:

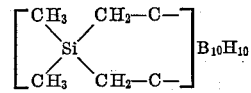

as described in Example V has the same structural formula as structural Formula I in FIGURE 1 with the exception that the hydrogen atoms indicated by the single and double asterisk are replaced by the radical:

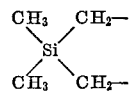

The compound $(CH_3)_2ClSi[CHC(B_{10}H_{10})]$ as described in Example VI has the same structural formula as structural Formula I in FIGURE 1 with the exception that the single hydrogen designated by a single asterisk is replaced by $-SiCl(CH_3)_2$.

The compound of the formula $$(CH_3)_2Si[CHC(B_{10}H_{10})]_2$$

as described in Example II has the same structural formula as structural formula II in FIGURE 1.

What is claimed is:

1. A process for the preparation of a silicon-containing organoboron compound which comprises reacting an organoboron alkali metal compound of the formula:

$$RR^aB_{10}H_8(CR^bCR^c)$$

wherein R and $R^a$ are each selected from the class consisting of hydrogen and an alkyl radical containing from 1 to 5 carbon atoms and wherein $R^b$ and $R^c$ are each selected from the class consisting of hydrogen, an alkali metal, and alkyl radical, and an alkenyl radical, at least one of $R^b$ and $R^c$ being an alkali metal and the total number of carbon atoms in $R^b$ and $R^c$ taken together not exceeding eight with a silane compound of the formula:

$$R_n^dSiR^e_{(4-n)}$$

wherein $R^d$ is selected from the group consisting of an alkyl radical containing 1 to 5 carbon atoms and an aryl radical containing not more than 10 carbon atoms and wherein $R^e$ is selected from the group consisting of a halogen and a haloalkyl radical containing from 1 to 5 carbon atoms, said halogen being selected from the group consisting of chlorine, bromine and iodine, and $n$ is an integer of from 1 to 3 with the proviso that when $R^e$ is a haloalkyl radical $n$ is at least 2.

2. The process of claim 1 wherein the said organoboron alkali metal compound is an organoboron lithium compound.

3. The process of claim 1 wherein the said organoboron alkali metal compound is $B_{10}H_{10}[CHC(Li)]$.

4. The process of claim 1 wherein the said organoboron alkali metal compound is $B_{10}H_{10}[C(Li)C(Li)]$.

5. The process of claim 3 wherein the said silane compound is $(CH_3)_3SiCl$.

6. The process of claim 3 wherein the said silane compound is $(CH_3)_2SiCl_2$.

7. The process of claim 3 wherein the said silane compound is $(C_6H_5)_3SiCl$.

8. The process of claim 3 wherein the said silane compound is $(CH_3)_3SiCH_2Cl$.

9. The process of claim 3 wherein the said silane compound is $(CH_3)_2Si(CH_2Cl)_2$.

10. Silicon-containing organoboranes selected from the class consisting of:

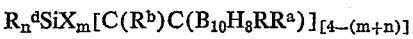

and

wherein R and $R^a$ are each selected from the class consisting of hydrogen and an alkyl radical containing 1 to 5 carbon atoms, wherein $R^b$ is selected from the class consisting of hydrogen, an alkyl radical containing 1 to 8 carbon atoms and an alkenyl radical containing 1 to 8 carbon atoms, wherein $R^d$ is an alkyl radical containing 1 to 5 carbon atoms, wherein X is a halogen selected from the class consisting of chlorine, bromine, and iodine, wherein $R^e$ is a haloalkyl radical containing 1 to 5 carbon atoms, said halogen being selected from the group consisting of chlorine, bromine and iodine, wherein $R^f$ is a bivalent saturated hydrocarbon radical containing 1 to 5 carbon atoms, wherein $n$ is an integer from 1 to 3, $m$ is an integer from 0 to 2, $r$ is an integer of from 0 to 1 and the sum of $m$ plus $n$ is not over 3.

11. $(CH_3)_3Si[CHC(B_{10}H_{10})]$.
12. $(CH_3)_2Si]CHC(B_{10}H_{10})]_2$.
13. $(C_6H_5)_3Si[CHC(B_{10}H_{10})]$.
14. $(CH_3)_3SiCH_2[CHC(B_{10}H_{10})]$.
15.

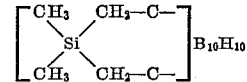

16. $(CH_3)_2ClSi[CHC(B_{10}H_{10})]$.

No references cited.

---

UNITED STATES PATENT OFFICE
CERTIFICATE OF CORRECTION

Patent No. 3,137,719            June 16, 1964

Stelvio Papetti

It is hereby certified that error appears in the above numbered patent requiring correction and that the said Letters Patent should read as corrected below.

Column 2, line 21, for "ralical" read -- radical --; column 6, line 5, after "Formula" insert -- I --; column 8, line 6, for "$(CH_3)_2Si]CHC(B_{10}H_{10})]_2$" read -- $(CH_3)_2Si[CHC(B_{10}H_{10})]_2$ --.

Signed and sealed this 3rd day of November 1964.

(SEAL)
Attest:

ERNEST W. SWIDER            EDWARD J. BRENNER
Attesting Officer            Commissioner of Patents

UNITED STATES PATENT OFFICE

CERTIFICATE OF CORRECTION

Patent No. 3,137,719                              June 16, 1964

Stelvio Papetti

It is hereby certified that error appears in the above numbered patent requiring correction and that the said Letters Patent should read as corrected below.

Column 2, line 21, for "ralical" read -- radical --; column 6, line 5, after "Formula" insert -- I --; column 8, line 6, for "$(CH_3)_2Si]CHC(B_{10}H_{10})]_2$" read -- $(CH_3)_2Si[CHC(B_{10}H_{10})]_2$ --.

Signed and sealed this 3rd day of November 1964.

(SEAL)
Attest:

ERNEST W. SWIDER
Attesting Officer

EDWARD J. BRENNER
Commissioner of Patents